Feb. 12, 1952   J. B. WHITMORE ET AL   2,585,607
GLASS FURNACE CHARGING
Filed June 25, 1941   3 Sheets-Sheet 1
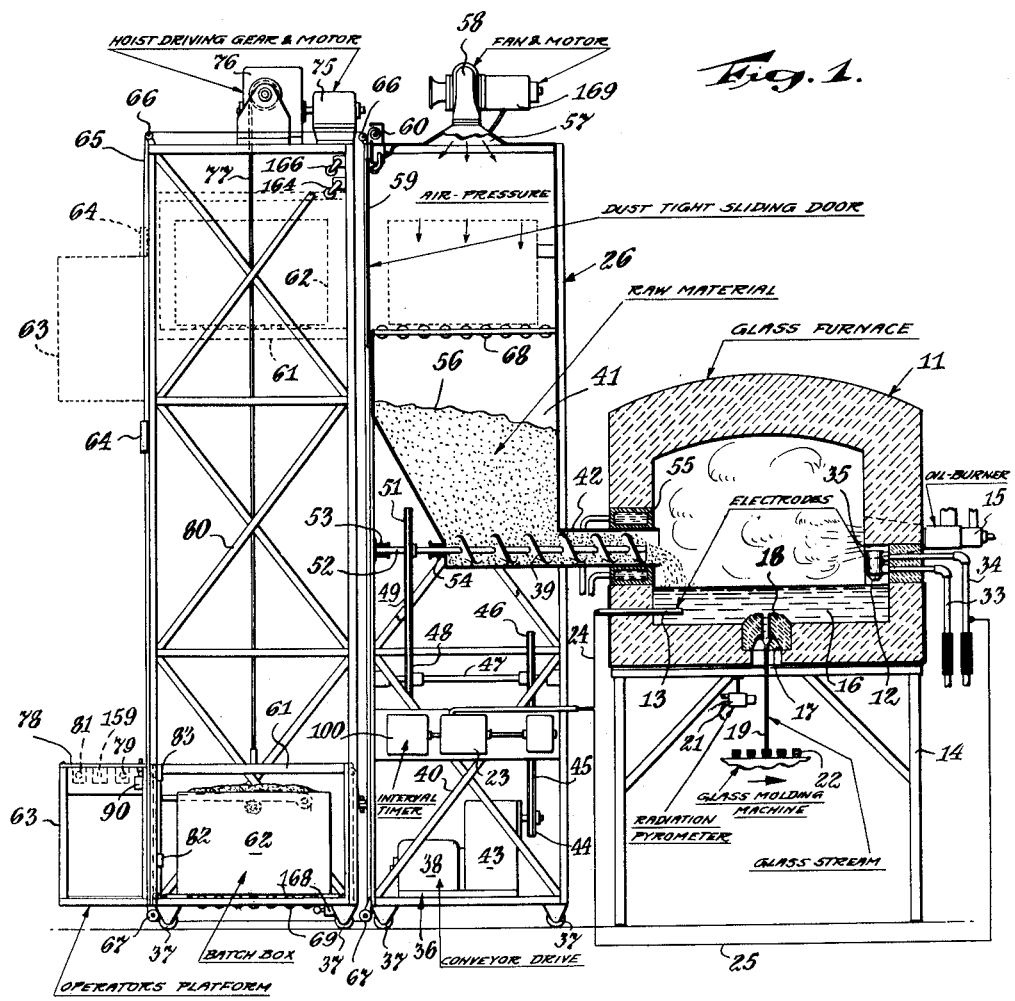
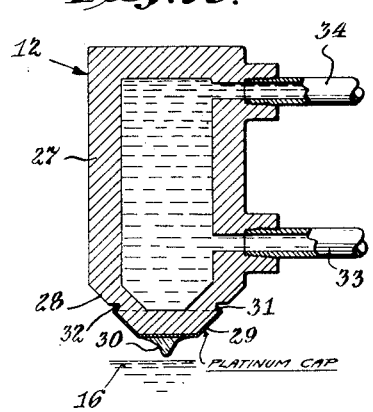
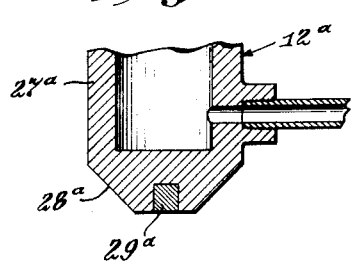
INVENTORS
J. B. WHITMORE
F. A. NEWCOMBE
BY
ATTORNEY

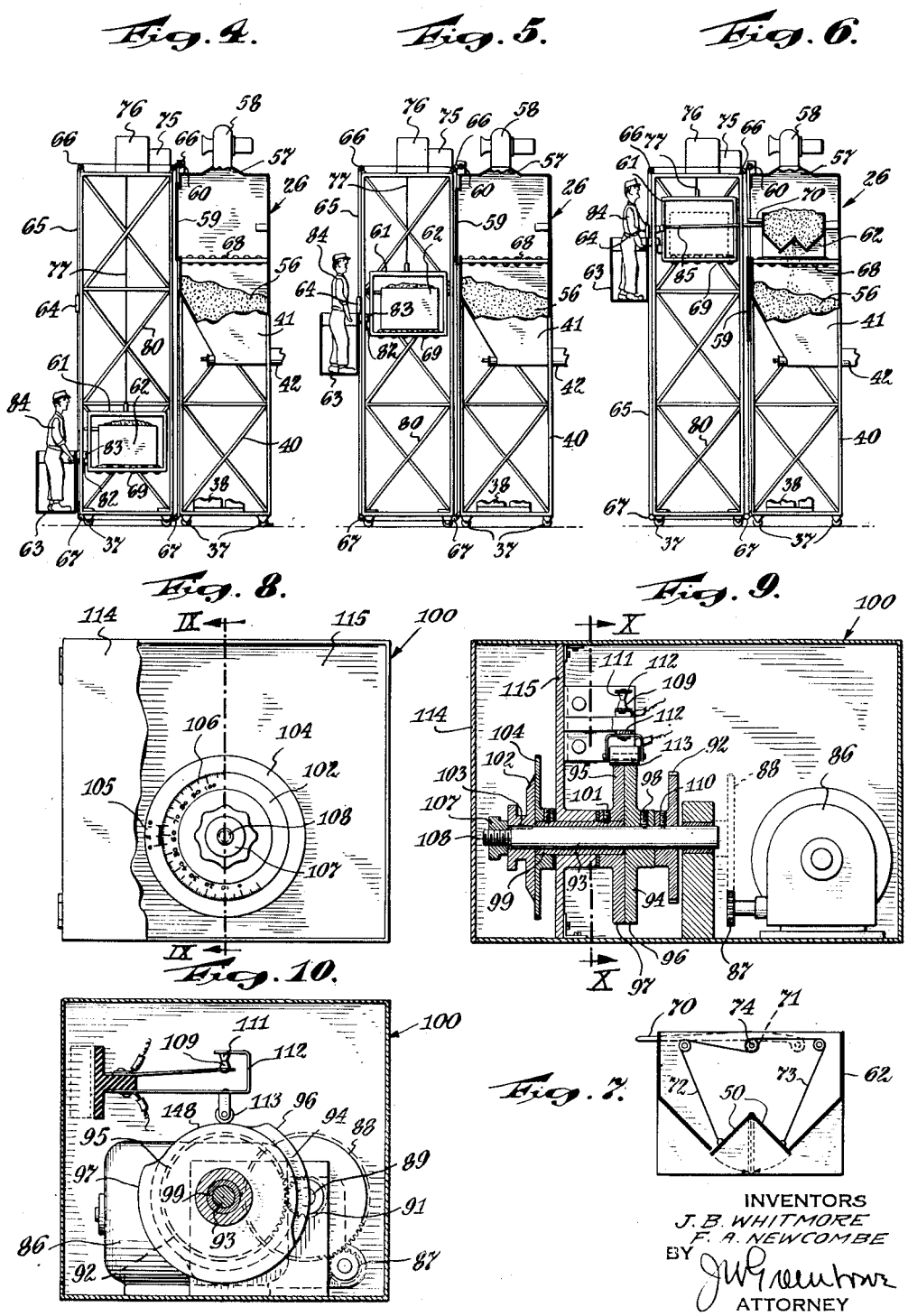

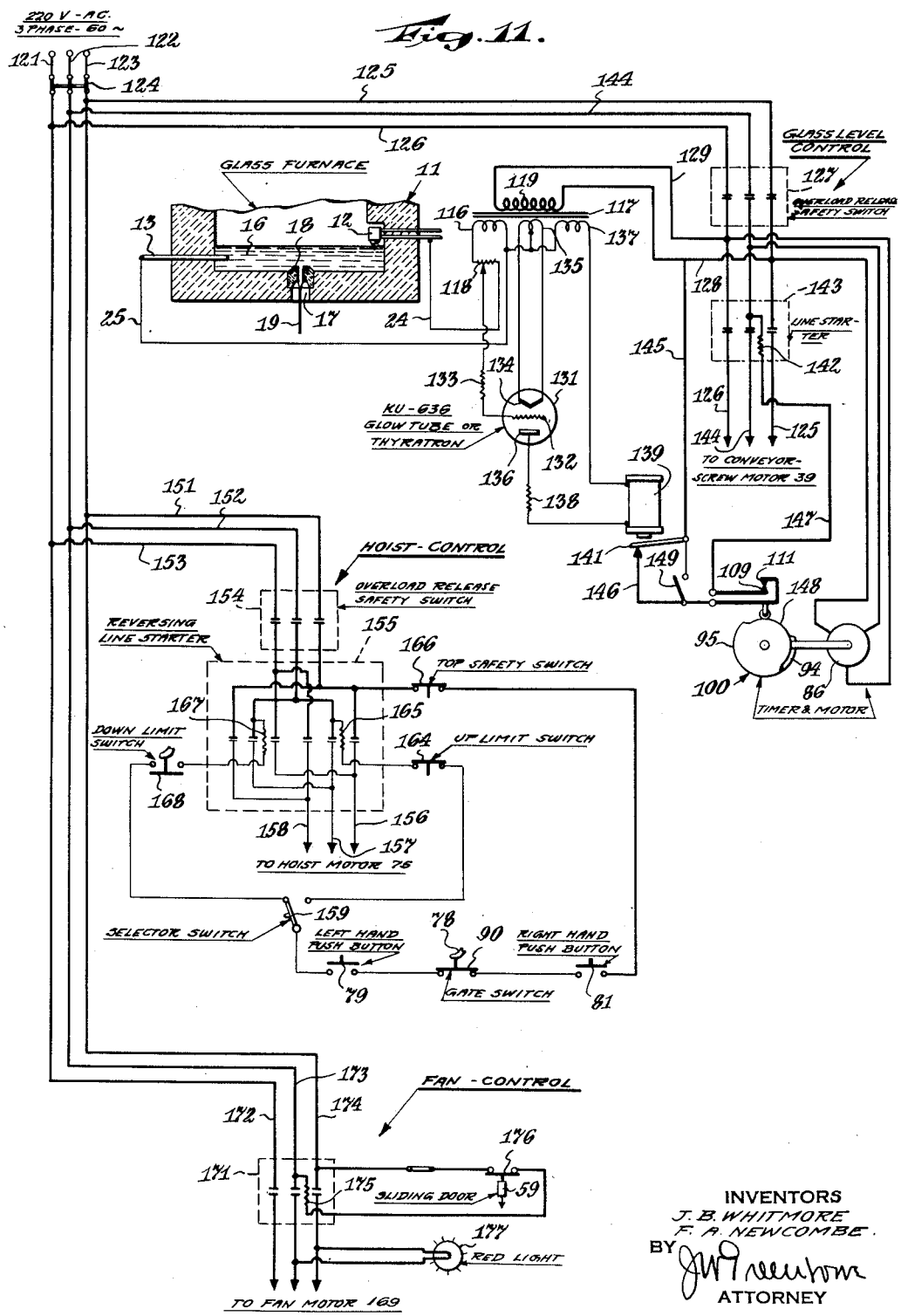

Patented Feb. 12, 1952

2,585,607

UNITED STATES PATENT OFFICE 2,585,607

GLASS FURNACE CHARGING

James B. Whitmore, Bloomfield, and Frank A. Newcombe, Nutley, N. J., assignors to Westinghouse Electric Corporation, East Pittsburgh, Pa., a corporation of Pennsylvania Application June 25, 1941, Serial No. 399,652

7 Claims. (Cl. 214—29)

This invention relates to apparatus for supplying molten glass, and more particularly to means for controlling the feeding of raw material to glass-melting furnaces.

The principal object of our invention, generally considered, is to provide for automatically maintaining the level of the liquid material in furnaces, and especially glass-melting furnaces.

Another object of our invention is the provision of a furnace charger operable through a glow tube or thyratron, in accordance with the level of liquid in the furnace, the operation of said control apparatus being determined by the resistance between a submerged electrode and one water-cooled which just touches or breaks contact with the glass.

A further object of our invention is the provision of a controller or timer which determines the proportion of each of short intervals which are "charging" when the level of molten glass or other material in a controlled furnace drops below an electrode, thereby calling for operation of the charger.

A still further object of our invention is the provision of a hoist for a batch box to load raw material, as the need arises, in a bin from which a furnace may be charged.

An additional object of our invention is the provision of a blower or fan for creating pressure in the raw material bin to balance the furnace pressure and keep the conveyor screw cool, with means for shutting off said blower when the charging door is open.

Another object of our invention is the provision of a special form of electrode for controlling a furnace, whereby it is not only kept sufficiently cool to avoid quick deterioration, but as the tip is of durable material, long life and uniformity in operation is assured.

A further object of our invention is the provision of apparatus for automatically maintaining the normal or a predetermined molten glass level in a glass melting furnace and devices for insuring safe operation of said apparatus and furnace.

Other objects and advantages of the invention, relating to the particular arrangement and construction of the various parts, will become apparent as the description proceeds.

Referring to the drawings illustrating our invention;

Figure 1 is a side elevational view, partly in vertical section, of a glass-melting furnace and associated hoisting and charging apparatus embodying our invention.

Figure 2 is an enlarged fragmentary vertical sectional view through the water-cooled electrode shown in Figure 1, water supply pipes being shown partly in elevation.

Figure 3 is a fragmentary view corresponding to Figure 2, but showing a modification.

Figure 4 is a horizontal sectional view of the hoisting and charging apparatus, as shown in Figure 1, but separated from the furnace, and illustrated in the position where the batch box hoist has just raised sufficiently to engage and start to lift the operator's platform therewith.

Figure 5 is a view corresponding to Figure 4, but showing a subsequent position in which the batch box hoist and operator's platform have risen part way towards the top of the raw material bin.

Figure 6 is a view corresponding to Figure 4, but showing the final position in which the batch box hoist and operator's platform have reached the top of their travel with respect to the bin, and the sliding door of the bin has been opened allowing the batch box to be moved from the dotted position to the full line position for subsequent dumping by the door releasing the operating lever or pawl, to discharge the material into the bin as represented.

Figure 7 is an enlarged sectional view of the batch box showing how the dumping doors are operated.

Figure 8 is a front elevational view of the interval timer preferably employed for controlling the operation of the charging mechanism.

Figure 9 is a vertical sectional view on the line IX—IX of Figure 8 in the direction of the arrows.

Figure 10 is a vertical sectional view on the line X—X of Figure 9 in the direction of the arrows.

Figure 11 is a wiring diagram for the apparatus illustrated in the preceding figures.

Prior to our invention, glass-melting furnaces of the assignee of the present application were charged by hand, usually at intervals of one-half hour. During such charging periods, lasting from two to three minutes, the furnace was shut down. Shutting down the furnace every half hour resulted in an interior temperature drop of several hundred degrees, causing considerable trouble in maintaining a uniform glass temperature, something that is of vital importance, especially in making bases as described and claimed in Patent No. 2,116,450, dated May 3, 1938, and owned by said assignee.

Due to the drop in furnace pressure, caused by shutting down the furnace while being charged, the glass flow decreased to such an extent that the machine had to be slowed down ten to fifteen per cent and remain at such reduced speed throughout the charging period. Such decrease in speed resulted in an average of 12% production loss for five minutes each hour, or an average loss of production of 1%. In accordance with the automatic charging apparatus which will now be described, feeding batch material to the furnace while the latter is in operation, eliminates the production loss.

Broadly speaking, the apparatus which embodies our invention, and is about to be described, comprises:

(1) Special electrodes and controller associated with a furnace to be controlled.
(2) A charging and driving unit.
(3) A hoist and batch box.
(4) An interval timer, and
(5) An electrical control circuit.

Referring to the drawings in detail, like parts being designated by like reference characters, and first considering the furnace 11 and associated electrodes 12 and 13, illustrated in Figures 1 and 2, it will be seen that said furnace is mounted on structural supporting means 14, and provided with an oil burner 15 for directing heat on the top of the glass, here shown as molten, and indicated by the reference character 16. The bottom of the furnace is apertured, as indicated at 17, and said aperture is, in the present embodiment, shown lined with a die 18 preferably formed of an alloy of platinum and rhodium, such as described and claimed in the Richardson Patent No. 2,190,296, dated February 13, 1940, and owned by the assignee of the present application and Baker and Company, Inc.

The temperature of the glass stream 19 issuing from the furnace, is desirably maintained uniform by sighting a radiation pyrometer 21 thereon and controlling the heat of the furnace by means of apparatus such as described and claimed in Patent No. 2,116,450 previously referred to, so that accurately controlled amounts of glass may be fed to each lamp base 22, or other receiving device, as it passes thereunder.

In order to maintain the level of the glass in the furnace approximately uniform, and prevent the relatively wide variations, from a normal or predetermined elevation within a predetermined permitted range of variation, which previously occurred when such furnaces were hand fed, the electrodes 12 and 13 are connected to control apparatus 23 by means of lines 24 and 25, whereby the operation of the charging mechanism, generally designated as 26, is controlled. The electrode 12 is preferably of special construction, such as shown in Figure 2, and comprises a hollow preferably generally cylindrical stainless steel (18% Ni, 8% Cr), contact member 27, the lower portion of which is frustoconical or tapered, as indicated at 28, and the lower flat surface and part of the frustoconical portion covered by a cap 29 of exceedingly durable material, preferably pure platinum .020" thick. The cap may completely cover the bottom and extend approximately one-half inch up the side, being secured to the frustoconical portion 28 by crimping the top edge portion 31 into a corresponding groove 32 in the electrode. The use of a platinum cap prevents the formation of high resistance scale and the tapering to a relatively small bottom area decreases the size of the glass teat 30 formed as contact is broken with the liquid surface, thereby decreasing the level change necessary to make and break contact with the glass.

Undesired oxidation and other deterioration of the electrode is desirably prevented by circulation of water into connecting stainless steel pipe 33 and out of connecting stainless steel pipe 34.

The modified form of electrode 12ª shown in Figure 3 comprises a hollow, preferably generally cylindrical stainless steel contact member 27ª, the lower portion of which is frustoconical or tapered, as in the form of Figure 2, as indicated at 28ª. The lower flat surface in the present instance, however, is provided with a downwardly opening aperture in which is fitted a platinum button 29ª, instead of a platinum cap as in the first embodiment.

As a further alternative, the hollow contact member may be made entirely of pure nickel instead of stainless steel, with no platinum cap or button employed.

The other electrode 13, being entirely covered with glass and thereby prevented from substantial oxidation, need not be water-cooled. It is desirably formed of stainless steel pipe with a piece of cold rolled steel inside. As an alternative, a piece of cold rolled steel rod may be used. By employing electrodes of different materials, that is, in this instance cold rolled steel and stainless steel, a decrease occurs in the resistance of the glass when the water-cooled electrode engages therewith. In other words, with the preferred arrangement described, resistance through the glass between the electrodes, is approximately 3 ohms, whereas without the arrangement, as when a solid stainless steel bar is used with a stainless steel water-cooled electrode, the resistance would be several times such a figure. These electrodes should be positioned at opposite sides of the furnace and somewhat remote from the charging inlet and oil burner, which latter may be disposed directly across from each other. The water-cooled electrode is shown protected by being disposed in a niche 35 in a wall of the furnace.

A desirable arrangement of the oil burner and electrodes is to position the former at one side of the furnace midway between the ends. The water-cooled electrode 12 is then positioned approximately midway between one of the ends and oil burner, and the other electrode 13 disposed directly opposite the water-cooled electrode. The die 18 may be disposed near one corner, as the front left-hand corner, as viewed in Figure 1.

The charging apparatus 26 and associated driving unit 36, shown in Figures 1, 4, 5, 6 and 7, are desirably carried on structural framing 40 provided with wheels 37 to allow for movement to and from one furnace or another as desired. The driving unit 36 may include a variable speed motor 38 to drive a screw conveyor 39, housed in the bottom of raw material bin 41 and cylindrical projection 42 therefrom, through gear train in box 43, pulley or sprocket wheel 44, belt or sprocket chain 45, pulley or sprocket wheel 46, jack shaft 47, pulley or sprocket wheel 48, belt or sprocket chain 49, and pulley or sprocket wheel 51 fixedly mounted on conveyor shaft 52, in turn carried by bearings 53 and 54. The inner end of the conveyor screw 39, may be journalled or guided in cylindrical projecting portion 42 which, in turn, fits a preferably water-cooled header 55 mounted in a wall of the furnace 11. It will, therefore, be seen that turning of the conveyor screw in the proper direction feeds raw material 56 from the bin 41 into the furnace 11.

The top portion of the bin is desirably apertured, as indicated at 57, and a motor-driven blower or fan 58 so mounted with respect thereto that a pressure is maintained above the raw material in the bin, neutralizing or slightly exceeding the pressure in the glass furnace, which may be as high as 4½" of water.

In order to maintain this pressure, the bin is normally closed by a dust-tight sliding door 59. The door 59 is so mounted and operated by a spring 60 that it stays closed, because of the weight of the cable-carried abutment member 64. The associated hoist 61, is raised and lowered by means of reversible hoist motor 75, associated gears 76, and cable 77, and carries a batch box 62. When they reach the intermediate position shown in Figure 5, the associated operator's platform 63 engages said abutment member 64 and starts to raise it, thereby moving the cable 65 passing over pulleys 66 and 67, between said member and door, and causing said door to descend to the position illustrated in Figure 6. This makes it possible for the operator 84 to push the batch box, which has then reached its upper position, from the roller bottom 69 of the hoist 61 along the roller bottom 68 over the raw material 56.

Inasmuch as the batch box desirably holds as much material as the bin, and it is not desired to let the bin get too low, said box may be introduced when the bin is only half empty. For that reason, and for the additional reason that it is not desired to dump the batch box when the door is open because it is a dust-raising operation, said box has drop doors 50 in the bottom thereof, held closed by cables 72 and 73 wound up on a shaft carrying a ratchet 71 controlled by a pawl 70, elongated so that its end extends beyond the batch box to provide an opearting handle. When the batch box is properly positioned, as illustrated in Figure 6, the handle of the pawl 70 extends to the left such a distance that, upon disengagement with the cable-carriel abutment member 64 when the operator 84 causes the hoist to descend, the door 59 trips the pawl 70 and releases the ratchet 71 and drop doors 50, as it returns to closed position.

The batch box is left in the position shown in Figure 6 until some convenient time after it is emptied, whereupon the operator raises the hoist to the position shown in Figure 6 and pulls the batch box from the full to dotted line position shown in said figure, and winds up the ratchet shaft 74 to close the drop doors 50 and thereby place the batch box 62 in condition for reloading.

The operator's platform 63 slides along the outside of the supporting frame work 80 and carries a gate 78 controlling a switch 90 and right and left hand push buttons 79 and 81, the functions of which will be described in connection with the wiring diagram. The platform 63 is so arranged with regard to the hoist 61, that it does not start to rise immediately but only upon the hoist reaching the position shown in Figure 4, where lug means 82 thereon engage corresponding lug means 83 on said platform to move the latter therealong, whereby when the uppermost position, illustrated in Figure 6, is reached, the operator 84 will be at the proper elevation to push the batch box from the dotted to the full line position, or remove the same from the full to the dotted line position, illustrated, as by means of an operating pole 85.

The conveyor screw 38 may be operated continuously, the driving motor 38 being run slow enough so that overcharging does not result. However, we have found it more desirable to operate it intermittently, as by allowing the conveyor to operate a proportion of every five-minute interval, depending on the rate of the withdrawal of glass from the furnace.

In order to accurately set the proportion of each five-minute interval during which the conveyor will operate when the electrode circuit is such that charging is called for, we have provided a cycle control or interval timer 100 of heavy duty construction, suitable for hard usage twenty-four hours per day without attention, which timer is easily and quickly adjustable for various time cycles, reference being had to Figures 8, 9 and 10.

The timer 100, illustrated in these figures, comprises a synchronous gear-head motor 86 with an outside gear train comprising spur pinion 87, gear wheel 88, jack shaft 89, spur pinion 91, and gear wheel 92, fixed on drive shaft 93, as by set screw 110. Mounted on the drive shaft 93 and sleeve or loose bushing 99, respectively, are disks 94 and 95, preferably formed of "bakelite" or other suitable insulating material, and having raised portions or high dwells 96 and 97, respectively, extending 180° around the circumference of each. The sleeve 99 is journalled in the timer panel 115, desirably formed of "bakelite" or other suitable material, and the shaft 93 is journalled in the sleeve. The disk 94 is fastened to the shaft 93 as by set screw 98, while the disk 95 is fastened to the sleeve 99 as by set screw 101.

The interval timer 100 of the present embodiment, also has a small dial 102 keyed to the shaft 93, as indicated at 103, but longitudinally movable thereon, and a large dial 104 carrying a vernier 105 cooperating with the graduations or scale 106 on the small dial 102. A knurled nut 107 threaded to a portion 108 of reduced diameter, extending from the shaft 93, serves to frictionally clamp the small and large dials together in adjusted relationship, it being understood that the zero on the vernier can be set to register with any point on the small dial scale. On account of the disk 95 being fixed to the same sleeve 99 as the dial 104, any movement of this large dial also moves the disk. The disk 94 is thus positively driven while the disk 95 is frictionally driven therewith. Therefore, the setting as read from the small dial is the exact setting of the Bakelite disks, which, in turn, governs the time the associated contacts 109 and 111 are closed.

The contact 111 is carried by a spring member 112, provided with a depending roller 113, which rides on the disks 94 and 95 as they are turned by the motor 86, thereby separating and causing engagement of the contacts 109 and 111, as desired, in accordance with the setting. The motor 86 in the present embodiment is timed so that one revolution of the disks is made every five minutes.

The disks 94 and 95 can be so set that raw material is fed to the furnace for periods of time ranging between zero and 2½ minutes of each of these five-minute cycles. In actual operation the cycle control runs continually twenty-four hours a day from Monday to Friday, while the furnace is operated. It is desirably set to feed more glass than is drawn out of the furnace, so that some time during a twenty-four-hour period, the glass level control, including the electrodes 12 and 13, shuts off the operation, resulting in no more raw material being fed for periods of fifteen minutes or more.

The cycle control or timing arrangement can be set so that the amount of raw material fed into the furnace exactly equals the glass drawn out of it, and as long as this balance is maintained the glass level control is not necessary. The charging apparatus has been run in this manner with a visual check on the glass level every eight hours and compensating adjustments made to maintain a fairly uniform glass level.

As examples of how the timer may be adjusted, when the vernier is set to register with the zero on the small dial, the 180° high dwells supplement one another, so that the contacts 109 and 111 are always held apart and do not engage during the cycle. If the zero on the vernier is set to register with 40 on the small dial, the contacts are closed for 1/5 of a revolution, or for one minute each cycle, and at 80 the contacts are closed for two minutes each cycle. This is, of course, on the assumption that the small dial is graduated 100 divisions for 180° thereof. After the desired setting is made, the knurled nut 101 is tightened clamping the dials together, so that both dials rotate with the main shaft, making one revolution in a short time interval, such as five minutes. The entire timer is desirably enclosed in a metal box, a door 114 in the front exposing when open the front of the "bakelite" panel 115 and the dials.

The outstanding features of this interval timer or control unit are:

(1) It is rugged and will stand up for a long period of time, even when operated continuously.

(2) It is simple in operation and low in cost.

(3) Timing or setting of the contacts can be easily and quickly made with no exposure to electrical wiring.

(4) The setting of the contacts can be readily ascertained by looking at the dials.

Although we have stated that a preferred cycle is five minutes, it will be understood that any desired period of time may be selected by merely changing the gear ratio or speed of operation of the shaft 93. It will also be understood that another contact device, such as a mercury switch, may be substituted for the plain metal contacts 109 and 111, and that other graduations besides 100 per 180° may be employed.

Electrical control diagram

Referring now to Figure 11, which is a wiring diagram of the apparatus for the electrical control of the glass furnace level, we find that the electrodes 12 and 13 are connected to the secondary winding 116 of a transformer 117 through resistance 118 by means of lines 24 and 25. The primary winding 119 of the transformer 117 is energized in this instance from three-phase 60 cycle, 220 volt A. C. supply lines 121, 122 and 123, which are connected to the circuits of the figure under consideration through main switch 124. The transformer primary 119 is shown connected to the branch lines 125 and 126, through overload release safety switch 127 and lines 128 and 129.

When heat is supplied to the furnace 11, let it be assumed that the glass level is out of contact with the electrode 12, as illustrated. Let us also assume that the furnace temperature is between 2500 and 2700° F. above the glass. At this temperature the gases inside the furnace are fairly good conductors and the glass, which probably reaches a temperature of 2350° F. is an excellent conductor.

Now by connecting the secondary winding 116, desirably supplying 6 volts, and resistance 118, desirably about 200 ohms, across the electrodes as shown, control may be obtained, as by the connections illustrated, with the thyratron 131, which may be a glow tube, the Radio Corporation of America designation of which is KU636. The control is in accordance with the resistance of the gases between the bottom of the electrode and the top of the molten glass, plus the resistance of the molten glass between the electrodes 12 and 13.

As the gap between the electrodes and glass becomes less, as when charging at an unnecessarily fast rate, for example, the resistance becomes less and less until the molten glass touches the electrode 12. At the instant of contact the resistance drops to say approximately $\frac{1}{10}$ of that at which it might have had before the contact was made.

This variation in resistance shows that we have several means of control including:

To have the bottom of the electrode 12 at the top of the desired normal level height range and use the make-and-break resistance changes as a means of control.

In accordance with the diagram of Figure 11, it will be seen that we use the procedure outlined above, because the variation in resistance is greater and thus the control is more easily obtained.

In order to activate the tube 131 for starting and stopping the charging mechanism 26, the grid 132 of said tube is adjustably connected to the resistance 118 through another resistance 133, of desirably about 2500 ohms.

The filament 134 of the tube 131 is desirably energized by two-and-one-half volt secondary winding 135 of transformer 117 and the circuit to the plate 136 by 110 volt secondary winding 137, through resistance 138, desirably of about 125 ohms, and relay solenoid 139 which may be adapted for operation at 50 volts. The solenoid 139 operates an armature 141 to open the circuit through the solenoid 142 of the line starter to the conveyor screw motor 39 when the level of the glass 16 reaches such a height that the electrode 12 is engaged and sufficient current passes through the resistance 118 to reduce the negative bias on the grid 132 sufficiently to allow enough discharge to take place through the tube 131 to energize the solenoid 139 and draw the armature 141 from its contact with line 146.

It will be understood that when the solenoid 142 of the line starter 143 is energized, the latter closes its contacts and current passes to the conveyor screw motor 39 through lines 125, 126 and 144, protected by the overload release safety switch 127 in circuit therewith.

The circuit to the line starter solenoid 142 is from line 125 through lines 128 and 145, armature 141, line 146, timer contacts 111 and 109, and line 147 through solenoid 142 to line 144.

It will, of course, be understood that even when the armature 141 is released to close the circuit just outlined, as when the glass level drops to break contact with the electrode 12, thereby causing the negative bias on the grid 132 to be such that the tube 131 blocks and does not permit sufficient plate current to pass through the solenoid 139 to hold up said armature, the conveyor screw motor is only operated when the timer disks 94 and 95 allow the roller 113 to drop to the low dwell 148 provided by the adjustment of said disks as shown in Figure 11, to thereby permit engagement of the contacts 109 and 111. If, for any reason, it is desired to cut out the electrode control of the charging motor 38, the switch 149 may be closed and the furnace will then continue charging under the control of only the timing device 100, the continually running motor 86 of which takes power through branches from the lines 125, 126 and 144.

The hoist 61 for the batch box 62 is operated from the same power lines through branches 151, 152 and 153, overload release safety switch 154, and reversing line starter 155, from which the direct lines 156, 157 and 158 to the hoist motor 75 emerge. The hoist motor is controlled primarily by selector switch 159, which determines whether it raises or lowers the hoist 61, as by moving it to the right or the left, no operation, however, being permitted until the operator 84 gets on the platform 63, closes the gate 78 thereof to thereby close the gate switch 90, and then pushes both the left and right hand buttons 79 and 81 to effect a complete closure of the circuit to the motor.

If the operator moves the switch to the right from the position illustrated, the circuit is completed to the right hand solenoid 165, closing only the three right hand contacts to cause the hoist motor to operate and lift the hoist until the latter reaches the top of its travel when the "up limit switch" 164 is opened, thereby breaking the circuit to the solenoid 165 and stopping the hoist motor. If, for any reason, the up limit switch fails to work, the top safety limit switch 166, immediately thereabove, would be opened, effectively breaking the circuit to the solenoid 165.

When the operator desires to cause the hoist to descend, he moves the selector switch to the position at the left illustrated, the gate switch 90 being closed and the push buttons 79 and 81 depressed, whereupon the left hand solenoid 167 is energized, closing only the three left hand contacts of the line starter 155 and causing the hoist to descend until it opens the "down limit switch" 168, breaking the circuit to the solenoid 167 and causing the contacts to open and stop the motor.

The motor 169 of the fan or blower 58 is operated from the power lines 121, 122 and 123, through lines 172, 173 and 174, and line starter 171. It will be noted that the line starter solenoid 175 is always energized by a circuit from the lines 173 and 174, except when the sliding door 59 descends and opens the contact 176, thereby de-energizing the solenoid 175 and stopping the fan or blower 58, as is desired, when the door 159 is open for charging the bin 41. A red lamp 177 is desirably energized from lines 173 and 174 when the fan motor is in operation. A de-energization of said lamp indicates to the operator that the fan has stopped, as when the switch 176 is opened by the sliding door dropping thereunderneath.

From the foregoing it will be seen that we have devised apparatus which automatically causes a charging screw 39 to intermittently operate in accordance with the setting of the timer 100, and feed raw material into the furnace 11 until the glass level is such that the electrode 12 is engaged, resulting in energization of the solenoid 139 and a withdrawal of the armature 141 to break the circuit to the line starter solenoid 142, stopping the conveyor screw motor until the level again drops to just break contact with said electrode, which may therefore be considered as the lower limit of the normal level height range. The term "normal level" thus means a level within the range between and including that level at which the electrode 12 is contacted by the glass on rising, and that at which the glass breaks contact with said electrode on falling. This dropping again de-energizes the solenoid 139, causing the armature 141 to again close the circuit and allow re-energization of the conveyor screw motor, as provided by the timing mechanism 100.

When the raw material in the bin 41 becomes so depleted that replenishment is necessary, an operator gets on the platform 63 with a loaded batch box 62, closes the gate 78, moves the selector switch 159 to the right, pushes the buttons 79 and 81, and thereby effects a raising of the batch box 62 to the position shown in Figure 6, and opening of the door 59, stopping the motor 169 and its fan 58. The operator then pushes the batch box to the position shown in full lines in said figure, where the outer end of the pawl 70 is in the line of movement of the door 59.

To return, the operator moves the selector switch 159 back to the position represented in Figure 11 and pushes the buttons 79 and 81, whereupon the hoist motor 75 reverses and lowers the hoist 61, operator's platform 63, and operator 84 thereon, first to the position shown in Figure 5 where the door 59 is again closed and the fan again put in operation, then to the position illustrated in Figure 4, where the operator reaches the lowermost position, and finally to the position illustrated in Figure 1 where the hoist motor is stopped by the down limit switch 168 being opened.

Closing of the door 59 raises or trips the pawl 70 to release the ratchet 71 and allow the contents of the batch box to drop into the bin 41, as represented in Figure 6. The operator at some convenient time returns the hoist to the position of Figure 6, pulls the empty batch box 62 into the hoist 61, and descends with it to the position of Figure 1.

Although a preferred embodiment of our invention has been disclosed, it will be understood that modifications may be made within the spirit and scope of the appended claims.

We claim:

1. Apparatus for maintaining the liquid level in a furnace comprising means for charging said furnace, a circuit, including a relay armature from a power supply to said charging means, means for controlling the time during which said charging means acts, comprising a pair of spaced electrodes in said furnace, one of which is submerged in, and the other disposed at a higher elevation so that it alternately touches the top surface of, and breaks contact with the contained liquid during furnace operation, said other electrode comprising a hollow metal element having a frusto-conical lower portion, the sides of which are provided with notches, a platinum cap over the lower electrode surface with edge portions crimped in said notches, means for introducing and withdrawing cooling liquid with respect to said electrode, a powered electrical circuit including said electrodes and a resistor in series with some of the furnace-contained liquid therebetween, a grid-containing control tube, having a plate circuit, whose grid is biased by a connection with said resistor so that its conductivity is affected by the variation in the current flow in said electrode circuit, and a solenoid in the plate circuit of said tube for controlling said armature, whereby said solenoid is energized to raise its armature and open the power supply circuit to said charging means, only when the higher electrode is engaged by the liquid, and said charging means thus operates only when material is needed to bring the liquid level up to contact said electrode.

2. Apparatus for maintaining a predetermined level of liquid glass in a melting furnace comprising means for charging said furnace, a powered circuit for energizing said charging means, a switch in said circuit for controlling said charging means, means comprising a pair of motor-driven cam disks rotatable with respect to one another, to provide a desired ratio between high and low dwells, and a make-and-break device operated thereby, for adjusting the part of each of uniform time intervals during which said furnace charging means operates, a first electrode submerged in said glass, a second electrode disposed above said first electrode, and a powered circuit including said electrodes, and a solenoid with said switch as its armature opened only when said solenoid is energized upon the glass level rising to contact said second electrode to decrease the circuit resistance and allow effective solenoid current to flow, whereby said furnace is charged until the liquid therein touches said second electrode and effects a stoppage of said charging means until the liquid drops out of contact again with said electrode.

3. Apparatus for maintaining a predetermined level of liquid glass in a melting furnace comprising means for charging said furnace, a first electric motor for driving said charging means, a powered circuit to said motor including a switch and a make and break device, and means for actuating said make and break device to control the operation of said charging means, comprising a pair of cam disks adjustable with respect to one another to provide a desired ratio between high and low dwells, a second motor for driving said adjusted disks at uniform speed, so as to operate said make and break device and close the circuit to said first motor when the one dwell engages the same and open it when the other dwell is in contact therewith, an electrode contacting said glass and another electrode with its lower end extending down to a level above which the glass should not rise to any extent, a powered circuit including said electrodes and a solenoid with said switch as its armature opened only when said solenoid is energized upon the glass level rising to contact said second-mentioned electrode to decrease the circuit resistance and allow effective solenoid current to flow so that the charging means motor stops when the glass level engages said second mentioned electrode and restarts when the glass drops out of contact therewith.

4. In combination with a glass-melting furnace, a raw material bin, a hollow cylindrical projection tube from said bin to said furnace, a conveyor screw in said tube, electrical power means for turning said screw to feed material from said bin out of said tube and into said furnace to provide an accumulation of molten glass therein, a power circuit to said feeding means and means for controlling the operation of said feeding means comprising a pair of cam disks adjustable with respect to one another to provide a desired ratio between high and low dwells, a motor for rotating said adjusted disks at uniform speed, a make-and-break device in said circuit and operated by said disks so as to close said circuit when one dwell engages the same and open it when the other dwell is in contact therewith, an electrode normally contacting said accumulation and another electrode with its lower end extending over said accumulation to a level above which said accumulation should not rise, a source of electric current in a circuit through said electrodes, the molten glass therebetween and a series resistor, a grid-controlled tube energized from another source, a connection between said resistor and the grid of said tube, so that a discharge occurs through the latter when the circuit current is high, and stops when it is reduced below a predetermined value, a solenoid connected to receive the discharge current from said tube, and an armature to said solenoid in said make-and-break device circuit, so that the solenoid pulls its armature and opens the circuit to said power means, when said accumulation engages said second-mentioned electrode, and keeps it open until it drops out of contact therewith.

5. Apparatus for maintaining the liquid level in a melting furnace comprising, charging means, a circuit including a relay armature from a power supply to said charging means, a pair of electrodes in said furnace disposed so that some of said liquid is therebetween, one of said electrodes being at a relatively low elevation so as to be always contacted by said liquid the other electrode being at a higher elevation so as to be contacted only after the liquid reaches a predetermined normal level, a second powered circuit including said electrodes and a solenoid controlling said relay armature, said solenoid being thereby energized to move said armature and open said first circuit when the liquid rises until it reaches said higher electrode, thereby decreasing the resistance in the second circuit and effecting an increase in the current therein, and timing mechanism including a pair of cam disks, one of which is fixed on a sleeve and the other on a shaft journalled in said sleeve, said disks having high dwells extending approximately 180° around their peripheries, whereby they may be adjusted with respect to one another to leave a low dwell of any desired length between 0 and 180°, means for showing the relative adjustment of said disks comprising a graduated dial on said shaft and another dial having a registering zero point thereon, means for tightening said dials in adjusted position with respect to one another to determine the length of the low dwell, means for turning said shaft and sleeve at a uniform predetermined speed, and a contact device in said charging-means-circuit, said device engaging said disks and moved thereby so that it opens and closes said circuit for predetermined time intervals in accordance with the speed of shaft rotation and the cam disk adjustment, whereby said charging means operates only when said relatively high electrode is not contacted by said liquid and also during only a desired portion of the disk rotation predetermined by the ratio between the dwells provided by said adjustment.

6. In combination with a glass melting furnace comprising a refractory enclosure having an aperture in a side wall thereof defined by a hollow header, a raw material charging bin, charging means comprising a screw conveyor passing through said header for feeding raw material from said bin to said furnace, a pair of electrodes in said furnace remotely disposed with respect to one another, one of said electrodes being at a relatively low elevation so as to be during operation always contacted by the molten glass, and the other being at a higher elevation so as to be contacted only after said glass reaches normal level, means controlling the operation of said charging means comprising a pair of cam disks adjustable with respect to one another to provide a desired ratio between high and low dwells, means for turning said adjusted disks, a powered circuit to said charging means, contacts in said circuit so arranged with respect to said cam disks that they are caused by engagement of said turning disks to engage and disengage in accordance with the difference in elevation between said high and low dwells, to energize and de-energize the charging means, a relay armature also in said charging means circuit, and a powered control circuit including said electrodes and a solenoid controlling said armature and energized only when the higher electrode is contacted by said glass to open said charging means circuit, whereby said charging means operates only when the level of the glass drops so that contact is broken with said higher electrode, and also only when said contacts are engaged by means of said cam disks.

7. Apparatus for maintaining the liquid level in a furnace comprising means for charging said furnace, a circuit including a relay armature from a power supply to said charging means, means for controlling the time during which said charging means acts, comprising a pair of spaced electrodes in said furnace, one of which is submerged in, and the other disposed at a higher elevation so that it alternately touches the top surface of, and breaks contact with, the contained liquid during furnace operation, a powered electrical circuit including said electrodes and a resistor in series with some of the furnace-contained liquid therebetween, a grid-containing control tube, having a plate circuit, whose grid is biased by a connection with said resistor so that its conductivity is affected by the variation in the current flow in said electrode circuit, and a solenoid in the plate circuit of said tube for controlling said armature, whereby said solenoid is energized to raise its armature and open the power supply circuit to said charging means, only when the higher electrode is engaged by the liquid, and said charging means thus operates only when material is needed to bring the liquid level up to contact said electrode.

JAMES B. WHITMORE.
FRANK A. NEWCOMBE.

REFERENCES CITED

The following references are of record in the file of this patent:

UNITED STATES PATENTS

| Number | Name | Date |
|---|---|---|
| Re. 19,788 | Amsler | Dec. 17, 1935 |
| 1,801,585 | Arthur | Apr. 21, 1931 |
| 1,842,919 | Simmons | June 26, 1932 |
| 1,867,489 | Bennett et al. | July 12, 1932 |
| 1,889,510 | Amsler | Nov. 29, 1932 |
| 1,924,907 | Bower | Aug. 29, 1933 |
| 1,941,897 | Hiller | Jan. 2, 1934 |
| 1,961,893 | Wadman et al. | June 5, 1934 |
| 1,977,969 | McIntosh | Oct. 23, 1934 |
| 1,998,038 | Wottring | Apr. 16, 1935 |
| 2,096,182 | Kerr et al. | Oct. 19, 1937 |
| 2,141,024 | Staley | Dec. 20, 1938 |
| 2,141,259 | Whittaker | Dec. 27, 1938 |
| 2,202,197 | Ewertz | May 28, 1940 |
| 2,234,858 | Brown et al. | Mar. 11, 1941 |
| 2,246,375 | Lyle | June 17, 1941 |
| 2,262,070 | Turk | Nov. 11, 1941 |
| 2,357,371 | Wolfner | Sept. 5, 1944 |
| 2,449,538 | Ackerman | Sept. 21, 1948 |